United States Patent
Li et al.

(10) Patent No.: US 10,716,151 B2
(45) Date of Patent: Jul. 14, 2020

(54) METHOD AND DEVICE FOR ESTABLISHING WIRELESS CONNECTION

(71) Applicant: SHANGHAI LIANSHANG NETWORK TECHNOLOGY CO., LTD., Shanghai (CN)

(72) Inventors: Haiyang Li, Shanghai (CN); Xiaolin Tong, Shanghai (CN); Zhengxiang Gu, Shanghai (CN)

( * ) Notice: Subject to any disclaimer, the term of this patent is extended or adjusted under 35 U.S.C. 154(b) by 0 days.

(21) Appl. No.: 16/118,455

(22) Filed: Aug. 31, 2018

(65) Prior Publication Data

US 2018/0376523 A1 Dec. 27, 2018

Related U.S. Application Data

(63) Continuation of application No. PCT/CN2016/112778, filed on Dec. 28, 2016.

(30) Foreign Application Priority Data

Apr. 5, 2016 (CN) .......................... 2016 1 0209465

(51) Int. Cl.
*H04W 76/10* (2018.01)
*H04W 12/00* (2009.01)
(Continued)

(52) U.S. Cl.
CPC ......... *H04W 76/10* (2018.02); *H04W 12/003* (2019.01); *H04W 12/06* (2013.01);
(Continued)

(58) Field of Classification Search
CPC ..... H04W 12/06; H04W 12/08; H04W 76/10; H04W 84/12; H04W 88/02; H04W 88/08
See application file for complete search history.

(56) References Cited

U.S. PATENT DOCUMENTS

2009/0310585 A1* 12/2009 Alizadeh-Shabdiz ...................... G01S 5/0263
370/338
2011/0211219 A1* 9/2011 Bradley ................. H04W 48/16
358/1.15
(Continued)

FOREIGN PATENT DOCUMENTS

| CN | 103036749 A | 4/2013 |
| CN | 103298072 A | 9/2013 |

(Continued)

*Primary Examiner* — Benjamin H Elliott, IV
(74) *Attorney, Agent, or Firm* — Kilpatrick Townsend & Stockton, LLP

(57) ABSTRACT

The purpose of the present application is to provide a method and device for establishing a wireless connection. In the present application, based on one or more scanned wireless access points, a user equipment acquires SSID information of a corresponding wireless access point, and requests access information corresponding to the corresponding wireless access point from a network device; the user equipment acquires the access information and displays accessible prompt information in a system wireless access point list of the user equipment; and the user equipment establishes a wireless connection with the corresponding wireless access point by means of the access information. A user preferably selects, based on accessible prompt information, a wireless access point the user requires.

10 Claims, 9 Drawing Sheets

(51) Int. Cl.
  *H04W 48/20* (2009.01)
  *H04W 12/06* (2009.01)
  *H04W 12/08* (2009.01)
  H04W 84/12 (2009.01)
  H04W 88/02 (2009.01)
  H04W 88/08 (2009.01)

(52) U.S. Cl.
  CPC ........... *H04W 12/08* (2013.01); *H04W 48/20* (2013.01); *H04W 84/12* (2013.01); *H04W 88/02* (2013.01); *H04W 88/08* (2013.01)

(56) References Cited

U.S. PATENT DOCUMENTS

| | | | | |
|---|---|---|---|---|
| 2013/0070641 | A1* | 3/2013 | Meier | H04W 8/005 370/254 |
| 2014/0010225 | A1* | 1/2014 | Puregger | H04W 12/06 370/338 |
| 2014/0057598 | A1* | 2/2014 | Steer | H04W 12/06 455/411 |
| 2015/0098459 | A1* | 4/2015 | Lee | H04W 48/14 370/338 |
| 2016/0050551 | A1* | 2/2016 | Qi | H04W 48/10 455/434 |
| 2016/0286343 | A1* | 9/2016 | Terashita | H04W 4/80 |
| 2017/0181047 | A1* | 6/2017 | Cai | H04W 36/08 |
| 2017/0201878 | A1* | 7/2017 | Yu | H04L 9/3268 |
| 2017/0251427 | A1* | 8/2017 | Xu | H04B 5/00 |
| 2018/0376523 | A1* | 12/2018 | Li | H04W 12/08 |

FOREIGN PATENT DOCUMENTS

| | | |
|---|---|---|
| CN | 103458408 A | 12/2013 |
| CN | 103945007 A | 7/2014 |
| CN | 104350802 A | 2/2015 |
| CN | 105163368 A | 12/2015 |
| CN | 105357742 A | 2/2016 |
| CN | 105682015 A | 8/2016 |

* cited by examiner

METHOD AND DEVICE FOR ESTABLISHING WIRELESS CONNECTION

CROSS-REFERENCES TO RELATED APPLICATIONS

This application is a continuation of International Application No. PCT/CN2016/112778, filed on Dec. 28, 2016, which claims priority to Chinese Patent Application No. 201610209465.7, filed on Apr. 5, 2016. The disclosures of the aforementioned applications are hereby incorporated by reference in their entireties.

FIELD OF THE INVENTION

The present disclosure relates to the field of computers, and in particular to a technology for establishing a wireless connection.

BACKGROUND OF THE INVENTION

In the prior art, when user equipment is to access a wireless network, for example, when the user equipment is to be connected to a WiFi (wireless fidelity) network, a selected target wireless access point is generally accessed first based on a connection password of wireless access points around a device searched by the user equipment, and then based on a connection password of a target wireless access point manually input by a user, and if the user forgets or does not know the connection password of the target wireless access point, the WiFi network corresponding to the target wireless access point may not be accessed.

BRIEF SUMMARY OF THE INVENTION

One embodiment of the present application is to provide a method and device for establishing a wireless connection.

According to one embodiment of the present application, a method for establishing a wireless connection at a user equipment end is provided, comprising:

acquiring a wireless access point near user equipment;

sending, to a corresponding network device, an access request for the wireless access point, and the access request comprises SSID information of the wireless access point;

acquiring access information, which corresponds to the wireless access point and is returned by the network device based on the access request, and displaying accessible prompt information on a wireless access point list of the user equipment; and establishing, based on the access information of the wireless access point, a wireless connection between the user equipment and the wireless access point.

According to another embodiment of the present application, a method for establishing a wireless connection at a network device end is further provided, comprising:

receiving an access request for a wireless access point sent by user equipment;

determining, based on the access request from the user equipment, access information corresponding to the wireless access point; and sending the access information of the wireless access point to the user equipment.

According to yet another embodiment of the present application, a device for establishing a wireless connection at a user equipment end is further provided, comprising:

first means for acquiring a wireless access point near user equipment;

second means for sending, to a corresponding network device, an access request for the wireless access point, and the access request comprises SSID information of the wireless access point;

third means for acquiring access information, which corresponds to the wireless access point and is returned by the network device based on the access request, and displaying accessible prompt information on a wireless access point list of the user equipment; and fourth means for establishing, based on the access information of the wireless access point, a wireless connection between the user equipment and the wireless access point.

According to yet another embodiment of the present application, a device for establishing a wireless connection at a network device end is further provided, comprising:

eighth means for receiving an access request for a wireless access point sent by user equipment;

ninth means for determining, based on the access request from the user equipment, access information corresponding to the wireless access point; and tenth means for sending the access information of the wireless access point to the user equipment.

Compared with the prior art, user equipment in the present application acquires, based on one or more scanned wireless access points, SSID information of corresponding wireless access points, and requests for access information corresponding to the corresponding wireless access points from a network device. The user equipment acquires the access information and displays accessible prompt information on a system wireless access point list of the user equipment. The user equipment establishes a wireless connection with a corresponding wireless access point according to the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. The user can access a wireless network by directly clicking on a wireless access point in a native system WiFi list based on the original usage habit, without establishing a wireless connection with the wireless access point by means of a third-party application end, thereby efficiently providing the user with an available wireless access point so as to satisfy the user's need for accessing the network, while simplifying the user operation and improving the user experience.

BRIEF DESCRIPTION OF THE DRAWINGS

By reading the following detailed description made with reference to the drawings for non-limiting embodiments, the other features, embodiments of the present disclosure will become more apparent.

Figure 1:
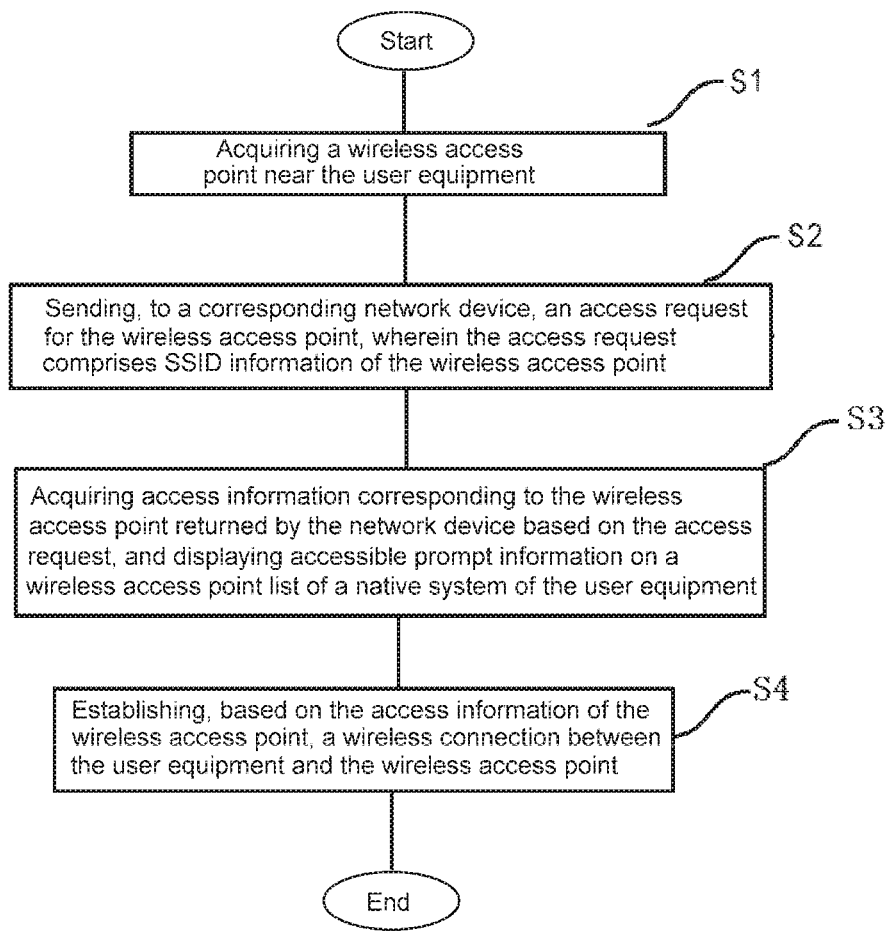
FIG. 1 shows a flowchart of a method for establishing a wireless connection at a user equipment end according to another embodiment of the present application.

In the drawings, the same or similar reference signs represent the same or similar components.

DETAILED DESCRIPTION OF THE INVENTION

The present disclosure is hereinafter further described in detail in conjunction with the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. A memory is an example of a computer-readable medium.

A computer-readable medium comprises permanent and non-permanent, movable and non-movable media and may realize information storage by means of any method or technology. The information may be a computer-readable instruction, a data structure, a program device or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

FIG. 1 shows a flowchart of a method for establishing a wireless connection at a user equipment end.

In one embodiment, in step S1, user equipment acquires a wireless access point near the user equipment; in step S2, the user equipment sends, to a corresponding network device, an access request for the wireless access point, and the access request comprises SSID information of the wireless access point; in step S3, the user equipment acquires access information, which corresponds to the wireless access point and is returned by the network device based on the access request, and displays accessible prompt information on a native system wireless access point list of the user equipment; and in step S4, the user equipment establishes, based on the access information of the wireless access point, a wireless connection between the user equipment and the wireless access point.

In one embodiment, in step S1, the user equipment acquires a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

In step S2, the user equipment sends, to a corresponding network device, an access request for a wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

In step S3, the user equipment acquires access information, which corresponds to the wireless access point and is returned by the network device based on the access request, and displays accessible prompt information on a native system wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point includes, but is not limited to, connection password information for accessing the wireless access point, and has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

In step S4, a wireless connection between the user equipment and the wireless access point is established based on the access information of the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, and requests for access information corresponding to the corresponding wireless access points from a network device. The user equipment acquires the access information and displays accessible prompt information on a system wireless access point list of the user equipment. The user equipment establishes a wireless connection with a corresponding wireless access point according to the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. The user can access a wireless network by directly clicking on a wireless access point in a native system WiFi list based on the original usage habit, without establishing a wireless connection with the wireless access point by means of a third-party application end, thereby efficiently providing the user with an available wireless access point so as to satisfy the user's need for accessing the network, while simplifying the user operation and improving the user experience.

Figure 2:
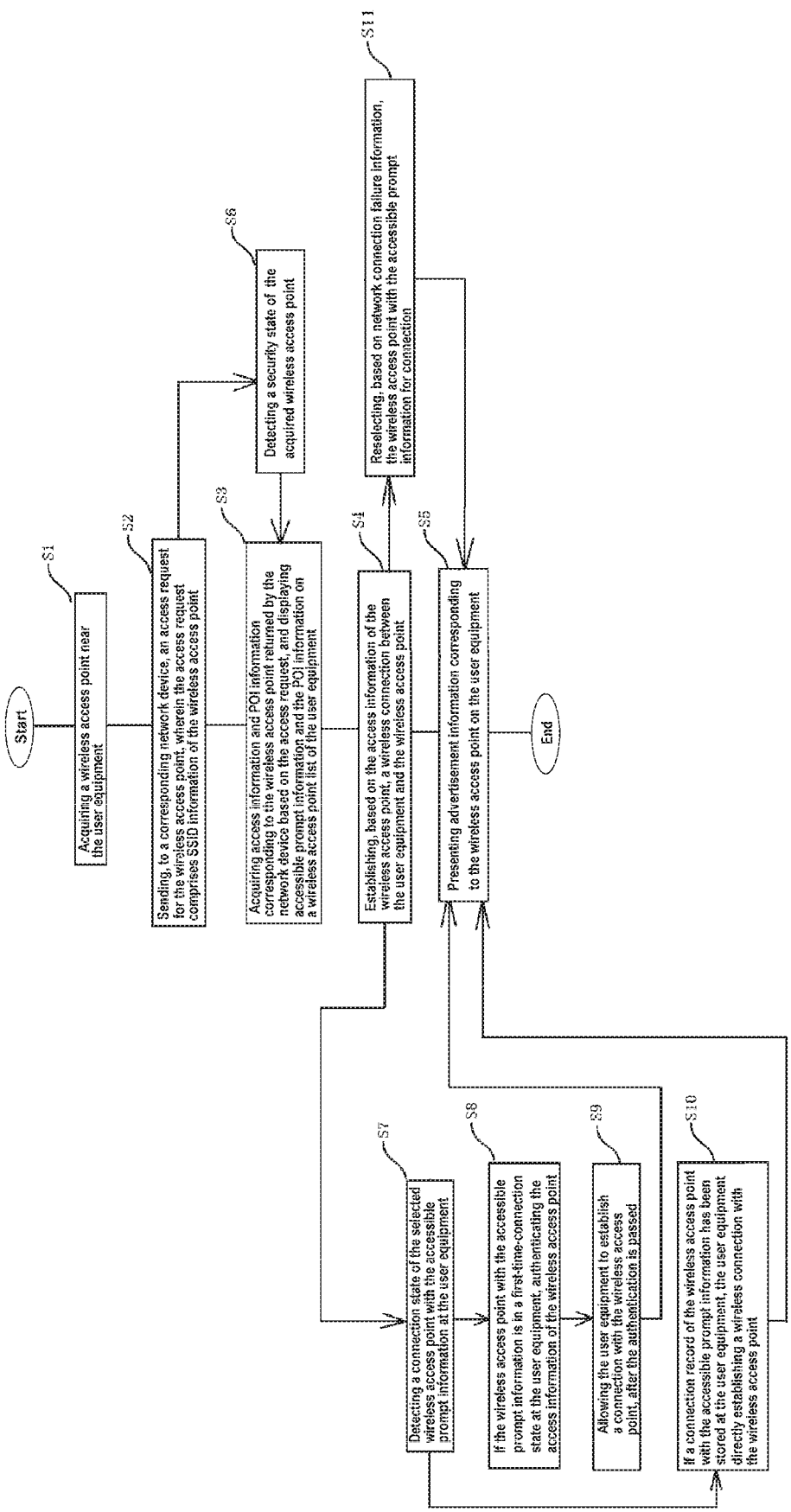
FIG. 2 shows a flowchart of a method for establishing a wireless connection at a user equipment end according to one embodiment of the present application.

FIG. 2 shows a flowchart of a method for establishing a wireless connection at a user equipment end according to one embodiment of the present application:

In one embodiment, in step S1, the user equipment acquiring a wireless access point near the user equipment; in step S2, the user equipment sending, to a corresponding network device, an access request for the wireless access point, and the access request comprises SSID information of the wireless access point; in step S3, the user equipment acquiring access information, which corresponds to the wireless access point and is returned by the network device based on the access request, and displaying accessible prompt information on a wireless access point list of the user equipment; in step S4, the user equipment establishing, based on the access information of the wireless access point, a wireless connection between the user equipment and the wireless access point; in step S5, presenting advertisement information corresponding to the wireless access point on the user equipment; in step S6, detecting a security state of the acquired wireless access point; in step S7, detect a connection state of the selected wireless access point with the accessible prompt information at the user equipment; in step S8, if the wireless access point with the accessible prompt information is in a first-time-connection state at the user equipment, authenticating the access information of the wireless access point; in step S9, allowing the user equipment to establish a connection with the wireless access point, after the authentication is passed; further, in step S10, if a connection record of the wireless access point with the accessible prompt information has been stored at the user equipment, the user equipment directly establishing a wireless connection with the wireless access point; and in step S11, reselecting, based on network connection failure information, the wireless access point with the accessible prompt information for connection.

In one embodiment, in step S1, the user equipment acquires a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

In step S2, the user equipment sends, to a corresponding network device, an access request for a wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

In step S3, the user equipment acquires access information, which corresponds to the wireless access point and is returned by the network device based on the access request, and displays accessible prompt information on a native system wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

In step S4, a wireless connection between the user equipment and the wireless access point is established based on the access information of the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In step S5, when the user equipment presents advertisement information corresponding to the wireless access point, the specific implementation steps comprise: detecting whether a trigger condition for presenting the advertisement information is satisfied; detecting whether a trigger condition for presenting the advertisement information is satisfied; and when the trigger condition is satisfied, presenting the advertisement information corresponding to the wireless access point on the user equipment, and the trigger condition comprises: acquiring a wireless access point that the user equipment selects to connect to; and acquiring, based on SSID information of the wireless access point, advertisement information corresponding to the wireless access point.

In one embodiment, a trigger signal corresponding to a trigger condition is a request for accessing the wireless access point from the user equipment, and the network device receives the condition of a request for accessing the wireless access point from the user equipment. Here, the request for accessing the wireless access point sent by the user equipment is a trigger signal satisfying the trigger condition, and the network device receives the trigger signal, indicating that the trigger condition is satisfied, and performs an action of determining the advertisement information corresponding to the wireless access point. When the user equipment needs to access the wireless access point, the network equipment needs to determine the advertisement information corresponding to the wireless access point by means of searching, matching, etc., and when the trigger condition comprises acquiring the wireless access point to be provided to a user, the advertisement information corresponding to the wireless access point is searched for and matched at the network device end, provided to the user equipment and presented to the user at the user equipment, and when the user accesses the wireless access point and then views the user equipment, the advertisement information near the wireless access point can be viewed.

In one embodiment, the trigger condition comprises acquiring advertisement information corresponding to the wireless access point, and when the trigger condition for acquiring the wireless access point that the user equipment selects to connect to is satisfied, the network device needs to determine the corresponding advertisement information near the position of the wireless access point according to the SSID information of the wireless access point accessed by the user, in particular, position information, namely latitude and longitude information; further, one or more pieces of advertisement information included in a certain range of the wireless access point may be determined by means of position matching, so that the advertisement information corresponding to the wireless access point may be determined and pushed to the user equipment, and the user equipment may receive the advertisement information and then present the advertisement information to the user.

In one embodiment, in step S6, a security state of the acquired wireless access point is detected, In one embodiment comprising: receiving a wireless signal from the wireless access point near the user equipment; acquiring the SSID information of the wireless access point; sending, to the network device, a security state detection request for the wireless access point, and the detection request comprises the SSID information; and acquiring security state detection information of the wireless access point.

In one embodiment, the network device further receives a detection request for a security state of the wireless access point sent by the user equipment, and determines connectability and security states of one or more pairs of wireless access points. The network device stores wireless access point information, which comprises: a network bandwidth of a wireless access point, the number of people connecting the current wireless access point, MAC address restricted information of a wireless access point, encryption information, signal strength information, access right information, access security information, connection speed information, geographical indication information, etc. The network device evaluates, according to a detection request from the user equipment and in combination with wireless access point information, the security states of one or more pairs of wireless access points: which wireless access points have a low success ratio for connection, and which wireless access points have security risk or are phishing wireless access points. A security state detection result is sent to user equipment, and the user equipment displays, according to the security state detection result, a security state of a wireless access point on a WiFi system list of the user equipment.

In one embodiment, in step S7, the user equipment detects a connection state of the selected wireless access point with the accessible prompt information at a mobile terminal; in step S8, if the wireless access point with the accessible prompt information is in a first-time-connection state at the user equipment, it is necessary to authenticate the access information of the wireless access point; in step S9, the user equipment is allowed to establish a connection with the wireless access point, after the authentication is passed; further, in step S10, if a connection record of the wireless access point with the accessible prompt information has been stored at the user equipment, the user equipment directly establishes a wireless connection with the wireless access point. Here, if the access information of the wireless access point selected by the user equipment originally has no connection record in the user equipment, that is, no corresponding access information is stored, the access information needs to be verified, and if the connection record of the selected wireless access point has already existed in the user equipment, that is, corresponding access information is stored, indicating that the access information has been verified, a wireless connection can be directly established with the wireless access point by means of the access information.

In one embodiment, in step S11, the wireless access point with the accessible prompt information is reselected for connection based on network connection failure information, with the specific implementation steps comprising: detecting a network connection state of the connected wireless access point; if a wireless connection between the user equipment and the wireless access point fails, acquiring the network connection failure information; and reselecting, based on the network connection failure information, the wireless access point with the accessible prompt information for connection. Here, the user equipment is currently connected to the wireless network of the corresponding wireless access point, but the current network condition may be poor; at this time, the user equipment determines the network condition by means of a network condition detection function, for example, by means of sending a PING (Packet Internet Groper) data packet to a target domain name or a target IP, determines the current network condition based on corresponding data packet information fed back, and then feeds the detected current network condition back to a corresponding user, so as to remind the user based on the current network condition, or autonomously determine to make a corresponding processing, for example, when it is determined that the current network condition is poor, the user is reminded to enable the wireless connection described in the present application to reselect a target wireless access point. Furthermore, the network condition detection function can be opened at any time during the entire process of the network connection of the user equipment, so that the current network condition of the user equipment can be positively fed back in real time, and thus an actual condition of unsmooth user network connection can be found as early as possible and solved, thereby optimizing the user experience.

In one embodiment, in practical applications, although sometimes the access information of the target wireless access point is known, the wireless connection may not be successfully realized, for example, a connection is established with the wireless access point based on the access information of the wireless access point returned by the network device, however, when the access information corresponding to an actual wireless access point changes and a corresponding update is not performed in time in the corresponding network device, a network disconnection occurs after a certain period of connection; and for another example, if a wireless access point signal is unstable, the network disconnection may also occur. At this time, the user can repeat a selection operation of the wireless access point and select another wireless access point; and at this time, the user equipment may also actively provide an appropriate candidate wireless access point for a corresponding user.

Firstly, if a wireless connection between the user equipment and the wireless access point fails to be established, the user equipment acquires WiFi network disconnection information, and the user equipment maintains a network connection state, for example, automatically opening or maintaining an original mobile communication network, such as a GSM network, a CDMA network, a 3G network, a 4G network, etc., or automatically opening or maintaining an original wireless local area network, such as a WiFi network, etc.; furthermore, in a network environment, when the wireless connection of the wireless access point is disconnected, the user equipment acquires corresponding network disconnection information; further, the user equipment may directly determine, based on the network disconnection information, the candidate wireless access point with the accessible prompt information in a WiFi system list of the user equipment; and at this time, the existence of the candidate wireless access point with the accessible prompt information indicates that the access information of the access point has been stored locally at the user equipment, and the user equipment establishes, based on the access information of the candidate wireless access point, a wireless connection between the user equipment and the candidate wireless access point. Here, the establishment of a connection with the candidate wireless access point may comprise prompting a user to select the candidate wireless access point, and then performing a corresponding wireless connection based on a user selection operation; and the establishment of a connection with the candidate wireless access point may further comprise automatically connecting the candidate wireless access point after the user equipment acquires the access information of the candidate wireless access point.

In this instance, user equipment acquires, based on one or more scanned wireless access points, SSID information of corresponding wireless access points, and requests for access information corresponding to the corresponding wireless access points from a network device. The user equipment acquires the access information and displays accessible prompt information on a system wireless access point list of the user equipment. The user equipment establishes a wireless connection with a corresponding wireless access point according to the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. The user can access a wireless network by directly clicking on a wireless access point in a native system WiFi list based on original usage habit, without establishing a wireless connection with the wireless access point by means of a third-party application end, and further, if a wireless connection between the user equipment and the wireless access point fails, a candidate wireless access point and corresponding access information can be acquired for the user equipment, thereby efficiently providing the user with an available wireless access point so as to satisfy the user's need for accessing the network, while simplifying the user operation and improving the user experience.

Figure 3:
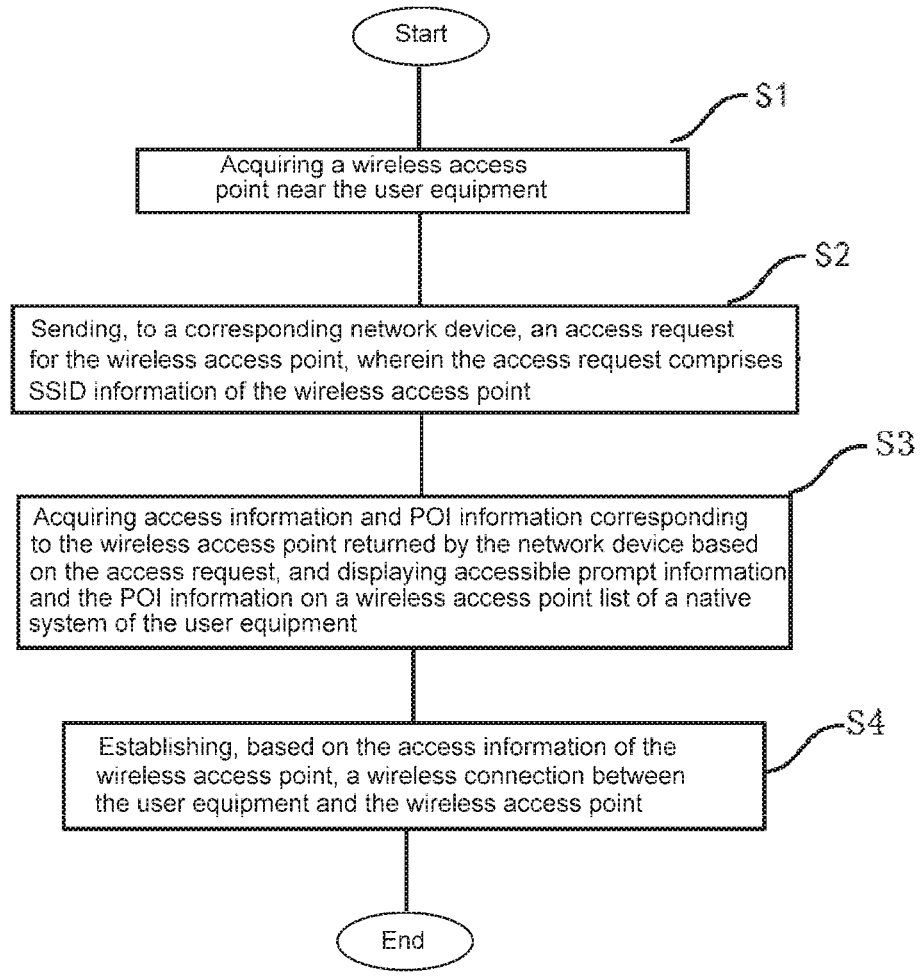
FIG. 3 shows a flowchart of a method for establishing a wireless connection at a user equipment end according to another embodiment of the present application.

FIG. 3 shows a flowchart of a method for establishing a wireless connection at a user equipment end:

In one embodiment, in step S1, user equipment acquiring a wireless access point near the user equipment; in step S2, the user equipment sending, to a network device, an access request for the wireless access point, and the access request comprises SSID information of the wireless access point; in step S3, the user equipment acquiring access information and POI information, which correspond to the wireless access point and are returned by the network device based on the access request, and displaying accessible prompt information and POI information on a native system wireless access point list of the user equipment; and in step S4, the user equipment establishing, based on the access information and the POI information of the wireless access point, a wireless connection between the user equipment and the wireless access point.

In one embodiment, in step S1, the user equipment acquires a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

In step S2, the user equipment sends, to a corresponding network device, an access request for a wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

In step S3, the user equipment acquires access information and POI information, which correspond to the wireless access point and are returned by the network device based on the access request, and displays the accessible prompt information and POI information on a native system wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment. Here, the POI is an abbreviation for "Point of Interest", and it can be translated as "兴趣点", or "信息点" in Chinese. A POI may be a house, a shop, a postbox, or a bus station, etc., and one POI information point at least has the contents of four embodiments: name, category, longitude and latitude (specific address). In one embodiment, when a third-party application end on the user equipment queries the network device for corresponding access information based on SSID information of one or more wireless access points and also queries whether the one or more wireless access points store corresponding POI information, and if the network device stores the POI information corresponding to the one or more wireless access points, the POI information is sent together with the access information of the wireless access point to the third-party application end of the user equipment, and the third-party application end of the user equipment interacts with the system WiFi device of the user equipment and displays the accessible prompt information and the POI information of the wireless access point at the same time on the native system WiFi list of the user equipment. Further, in several wireless access points presented by the user equipment, in combination with accessible prompt information and POI information corresponding to various wireless access points, a user selects a wireless access point which is needed by himself/herself to access the wireless network. Here, the POI information displayed in a system WiFi list of the user equipment can provide richer reference data for a user to select the wireless access point. For example: the SSID information of the wireless access point is displayed in a native system WiFi list of the user equipment, and a user may not accurately select, based on the SSID information, the wireless access point which is needed to connect by himself/herself, however, by displaying POI information in the native system WiFi list of the user equipment, the user can intuitively and conveniently connect, based on the POI information, the wireless access point to be connected, and the presentation of the POI information includes, but is not limited to, a network bandwidth, the number of connecting people, a merchant name, merchant discount information, address information, etc.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

In step S4, a wireless connection between the user equipment and the wireless access point is established based on the access information of the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, and requests for access information and POI information corresponding to the corresponding wireless access points from a corresponding network device. The user equipment acquires the access information and the POI information and displays accessible prompt information and the POI information on a system wireless access point list of the user equipment. The user equipment establishes a wireless connection with a corresponding wireless access point by means of the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. Further, the POI information displayed on the native system wireless list of the user equipment can efficiently provide the user with an available wireless access point so as to satisfy the user's need for accessing the network, while simplifying the user operation and improving the user experience.

Figure 4:
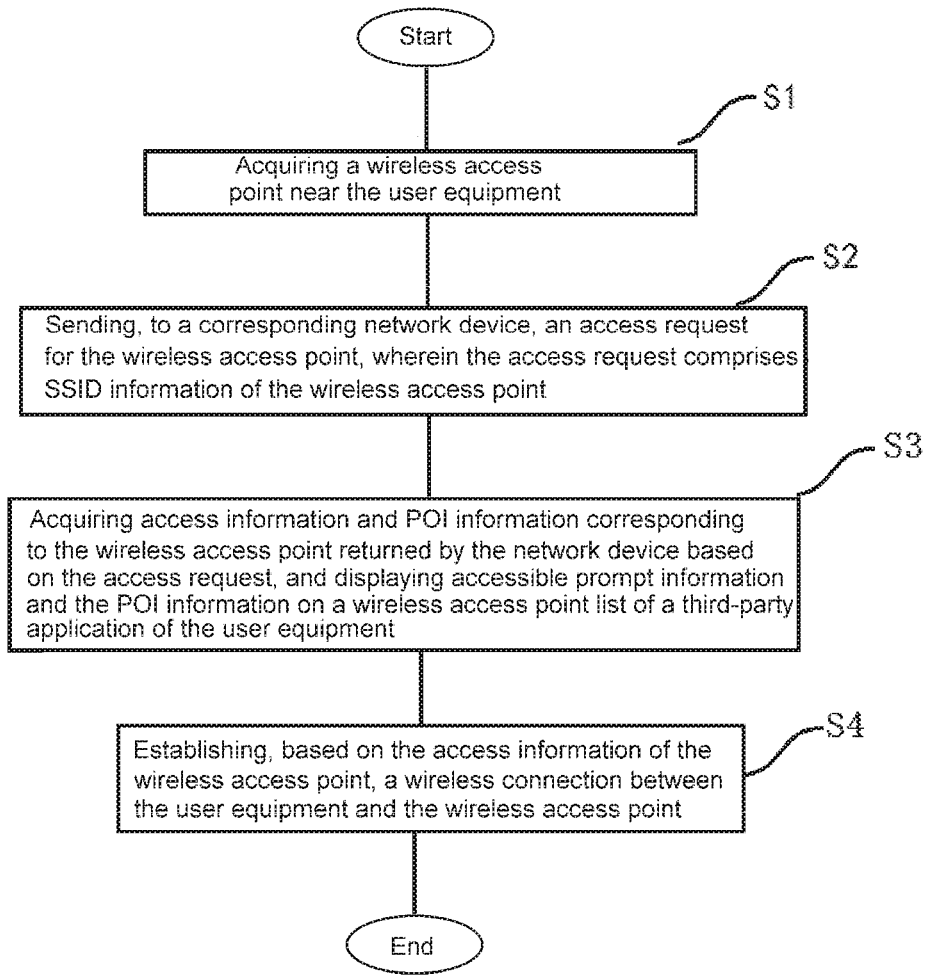
FIG. 4 shows a flowchart of a method for establishing a wireless connection at a user equipment end according to another embodiment of the present application.

FIG. 4 shows a flowchart of a method for establishing a wireless connection at a user equipment end:

In one embodiment, in step S1, user equipment acquiring a wireless access point near the user equipment; in step S2, the user equipment sending, to a network device, an access request for the wireless access point, and the access request comprises SSID information of the wireless access point; in step S3, the user equipment acquiring access information and POI information, which correspond to the wireless access point and are returned by the network device based on the access request, and displaying accessible prompt information and POI information on a wireless access point list of the user equipment; and in step S4, the user equipment establishing, based on the access information and the POI information of the wireless access point, a wireless connection between the user equipment and the wireless access point.

In one embodiment, in step S1, the user equipment acquires a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

In step S2, the user equipment sends, to a corresponding network device, an access request for a wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

In step S3, access information and POI information, which correspond to the wireless access point and are returned by the network device based on the access request are acquired, and accessible prompt information and the POI information on a wireless access point list of a third-party application end of the user equipment are displayed. Here, the access information of one or more wireless access points displayed in a WiFi list of the third-party application end of the user equipment is acquired by the user equipment from the network device based on its own scanning function and cooperation with the corresponding network device. Further, accessible prompt information is displayed on the WiFi list of the third-party application end of the user equipment. In the WiFi list of the third-party application end of the user equipment, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the third-party application end of the user equipment, in combination with the accessible prompt information corresponding to various wireless access points, a user selects a wireless access point which is needed by himself/herself to access the wireless network. In one embodiment, a WiFi device of the third-party application end of the user equipment scans out one or more wireless access points, acquires SSID information of the one or more wireless access points, and acquires access information of the wireless access point by means of the third-party application end on the user equipment, and the third-party application end on the user equipment queries the network device for corresponding access information based on the SSID information of the one or more wireless access points; and the network device sends the stored access information to the third-party application end of the user equipment, and accessible prompt information of the wireless access point is displayed on a WiFi list of the third-party application end of the user equipment. Here, the POI is an abbreviation for "Point of Interest". A POI may be a house, a shop, a postbox, or a bus station, etc., and one POI information point at least has the contents of four embodiments: name, category, longitude and latitude (specific address). In one embodiment, when a third-party application end on the user equipment queries the network device for corresponding access information based on SSID information of one or more wireless access points and also queries whether the one or more wireless access points store corresponding POI information, and if the network device stores the POI information corresponding to the one or more wireless access points, the POI information is sent together with the access information of the wireless access point to the third-party application end of the user equipment, and the accessible prompt information and the POI information of the wireless access point are displayed at the same time on the WiFi list of the third-party application end of the user equipment. Further, in several wireless access points presented by the third-party application end of the user equipment, in combination with the accessible prompt information and the POI information corresponding to various wireless access points, a user selects a wireless access point which is needed by himself/herself to access the wireless network. Here, the POI information displayed in the WiFi list of the third-party application end of the user equipment can provide richer reference data for a user to select the wireless access point. For example: the SSID information of the wireless access point is displayed in a native system WiFi list of the user equipment, and a user may not accurately select, based on the SSID information, the wireless access point which is needed to connect by himself/herself, however, by displaying POI information in the WiFi list of the third-party application end of the user equipment, the user can intuitively and conveniently connect, based on the POI information, the wireless access point to be connected, and the presentation of the POI information includes, but is not limited to, a network bandwidth, the number of connecting people, a merchant name, merchant discount information, address information, etc. In addition, an owner of a wireless access point can manage his/her own wireless access point by means of a third-party application end and modify POI information of his/her own wireless access point according to his/her own requirement, such that a user can more intuitively and rapidly find the wireless access point.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

In step S4, a wireless connection between the user equipment and the wireless access point is established based on the access information of the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, requests for access information and POI information corresponding to the corresponding wireless access points from a corresponding network device, acquires the access information and the POI information corresponding to the wireless access points and returned by the network device based on the access request and displays accessible prompt information and the POI information on a wireless access point list of a third-party application end of the user equipment. The user equipment establishes a wireless connection with a corresponding wireless access point by means of the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. Further, the POI information displayed on the wireless list of the third-party application end of the user equipment can efficiently provide the user with an available wireless access point so as to satisfy the user's need for accessing the network, while simplifying the user operation and improving the user experience. In addition, an owner of a wireless access point can manage his/her own wireless access point by means of a third-party application end and modify POI information of his/her own wireless access point according to his/her own requirement, such that a user can more intuitively and rapidly find the wireless access point.

Figure 5:
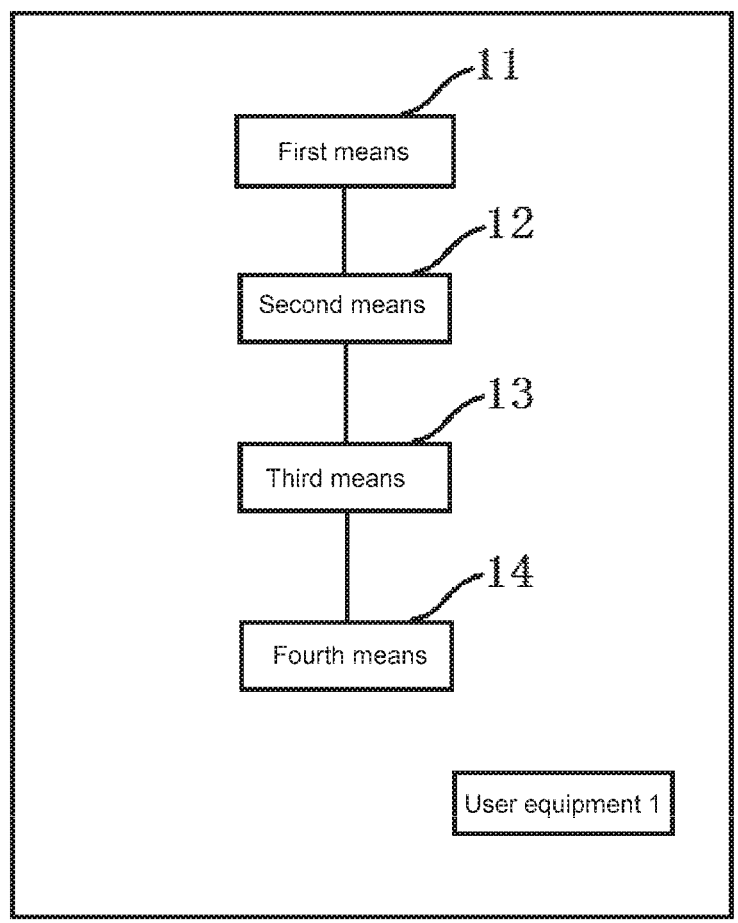
FIG. 5 shows a device schematic diagram of user equipment for establishing a wireless connection according to one embodiment of the present application.

FIG. 5 shows a device schematic diagram of user equipment for establishing a wireless connection, and first means 11 is used for acquiring a wireless access point near the user equipment; second means 12 is used for sending, to a corresponding network device, an access request for the wireless access point, and the access request comprises SSID information of the wireless access point; third means 13 is used for acquiring access information, which corresponds to the wireless access point and is returned by the network device based on the access request, and displaying accessible prompt information on a wireless access point list of the user equipment; and fourth means 14 is used for establishing, based on the access information of the wireless access point, a wireless connection between the user equipment and the wireless access point.

In one embodiment, the first means 11 is used for acquiring a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

The second means 12 is used for sending, to a corresponding network device, an access request for the wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

The third means 13 is used for acquiring access information, which corresponds to the wireless access point and is returned by the network device based on the access request, and displaying accessible prompt information on a wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment.

The fourth means 14 is used for establishing, based on the access information of the wireless access point, a wireless connection between the user equipment and the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, and requests for access information corresponding to the corresponding wireless access points from a network device. The user equipment acquires the access information and displays accessible prompt information on a system wireless access point list of the user equipment. The user equipment establishes a wireless connection with a corresponding wireless access point according to the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. Further, if a wireless connection between the user equipment and the wireless access point fails, a candidate wireless access point and corresponding access information can be acquired for the user equipment, thereby efficiently providing the user with an available wireless access point so as to satisfy the user's need for accessing the network, while simplifying the user operation and improving the user experience.

Figure 6:
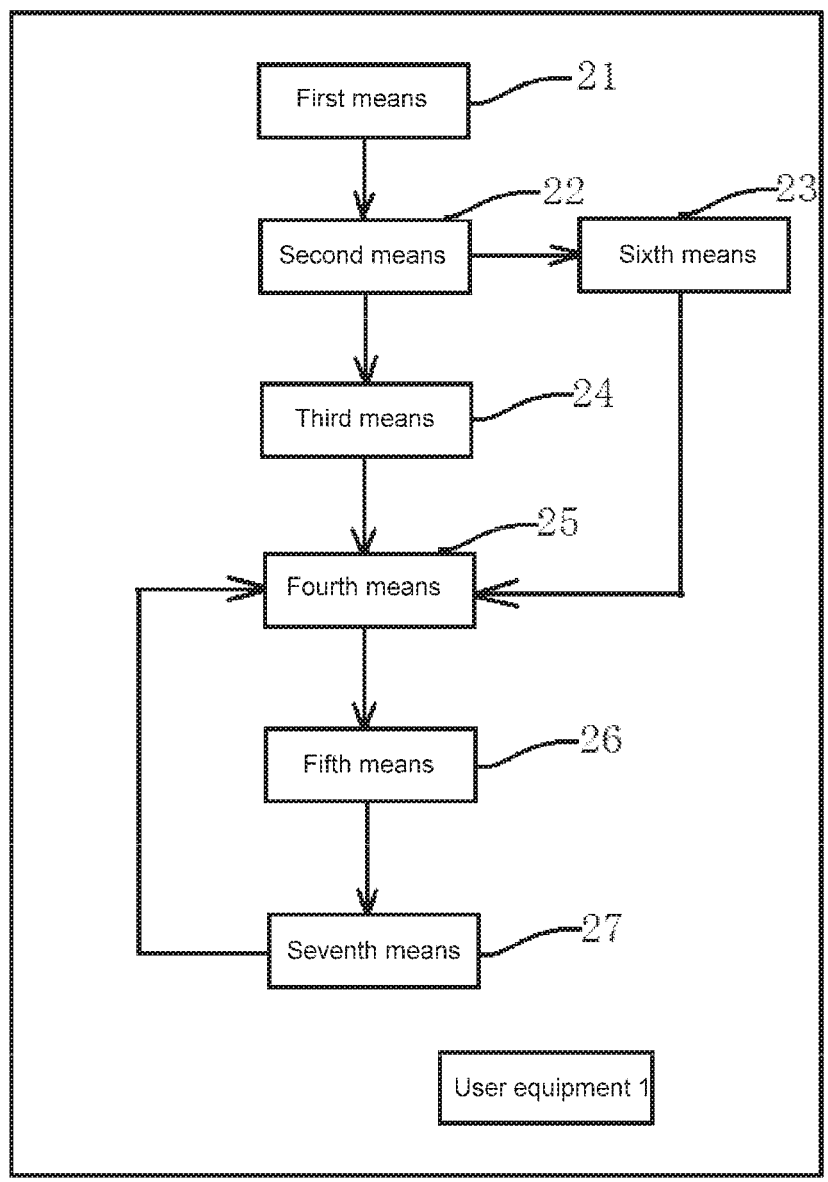
FIG. 6 shows a device schematic diagram of user equipment for establishing a wireless connection according to one embodiment of the present application.

FIG. 6 shows a device schematic diagram of user equipment for establishing a wireless connection according to one embodiment of the present application, and first means 21 is used for acquiring a wireless access point near user equipment; second means 22 is used for sending, to a corresponding network device, an access request for the wireless access point, and the access request comprises SSID information of the wireless access point; third means 24 is used for acquiring access information, which corresponds to the wireless access point and is returned by the network device based on the access request, and displaying accessible prompt information on a wireless access point list of the user equipment; fourth means 25 is used for establishing, based on the access information of the wireless access point, a wireless connection between the user equipment and the wireless access point; fifth means 26 is used for presenting advertisement information corresponding to the wireless access point on the user equipment; sixth means 23 is used for detecting a security state of the acquired wireless access point; and seventh means 27 is used for reselecting, based on network connection failure information, the wireless access point with the accessible prompt information for connection.

In one embodiment, the first means 21 is used for acquiring a wireless access point near user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

The second means 22 is used for sending, to a corresponding network device, an access request for the wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

The sixth means 23 is used for detecting a security state of the acquired wireless access point, and a third unit is used for receiving a wireless signal from the wireless access point near the user equipment; a fourth unit is used for acquiring SSID information of the wireless access point; a fifth unit is used for sending, to the network device, a security state detection request for the wireless access point, and the detection request comprises the SSID information; and a sixth unit is used for acquiring security state detection information of the wireless access point.

When the second means 24 requests for access information of a wireless access point, the sixth means 23 also detects the security state of the scanned wireless access point, while sending an access request and a security state detection request for the wireless access point to the network device. In one embodiment, the network device receives a detection request for a security state of the wireless access point sent by the user equipment; determines security states of one or more pairs of wireless access points; and sends security state detection information of the wireless access points to the user equipment. The network device stores wireless access point information, which comprises: a network bandwidth of a wireless access point, the number of people connecting the current wireless access point, MAC address restricted information of a wireless access point, encryption information, signal strength information, access right information, access security information, connection speed information, geographical indication information, etc. The network device evaluates, according to a detection request from the user equipment and in combination with wireless access point information, the security states of one or more pairs of wireless access points: which wireless access points have a low success ratio for connection, and which wireless access points have security risk or are phishing wireless access points. A security state detection result is sent to user equipment, and the user equipment displays, according to the security state detection result, a security state of a wireless access point on a system WiFi list of the user equipment.

The third means 24 is used for acquiring, by the user equipment, access information, which corresponds to the wireless access point and is returned by the network device based on the access request, and displaying accessible prompt information on a native system wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment.

Figure 7:
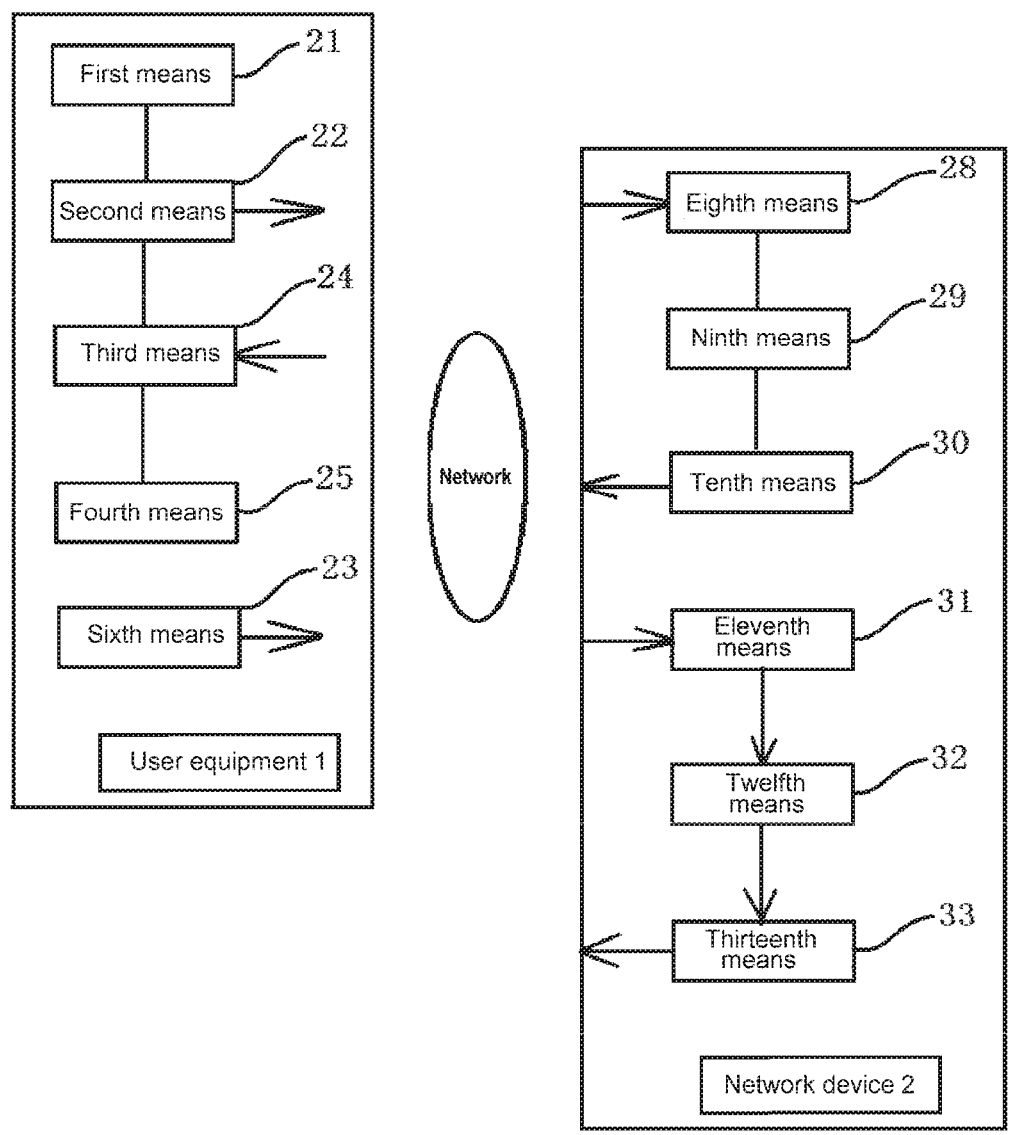
FIG. 7 shows a schematic diagram of an interaction between user equipment and a network device for establishing a wireless connection according to another embodiment of the present application.

As shown in FIG. 7, in the network device, the eighth means 28 is used for receiving an access request for a wireless access point sent by user equipment; the ninth means 29 is used for determining, based on the access request from the user equipment, access information corresponding to the wireless access point; and the tenth means 30 is used for sending the access information of the wireless access point to the user equipment. In addition, eleventh means 31 is used for receiving a detection request for a wireless access point sent by user equipment; and twelfth means 32 is used for determining, based on the detection request from the user equipment, connectability and security states of one or more pairs of wireless access points. Thirteenth means 33 is used for sending security state detection information of the wireless access points to the user equipment. In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and B SSID Information (the MAC address of the wireless access point) of the wireless access point. Further, if the access information corresponding to the target wireless access point exists in the network device, the access information matching the wireless access point can be found in the network device based on the SSID information.

Fourth means 25 is used for establishing, based on the access information of the wireless access point, a wireless connection between the user equipment and the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In one embodiment, the fourth means 25 comprises: a seventh unit for detecting a connection state of the selected wireless access point with accessible prompt information at a mobile terminal; an eighth unit for authenticating, if the wireless access point with the accessible prompt information is in a first-time-connection state at the mobile terminal, the access information of the wireless access point; and a ninth unit for allowing the mobile terminal to establish a connection with the wireless access point, after the authentication is passed. Further, a tenth unit is used for directly establishing, by a mobile terminal, a wireless connection with a wireless access point, if a connection record of the wireless access point with accessible prompt information has been stored in the mobile terminal. Here, if the access information of the wireless access point selected by the user equipment originally has no connection record in the user equipment, that is, no corresponding access information is stored, the access information needs to be verified, and if the connection record of the selected wireless access point has already existed in the user equipment, that is, corresponding access information is stored, indicating that the access information has been verified, a wireless connection can be directly established with the wireless access point by means of the access information.

The fifth means 26 is used for presenting advertisement information corresponding to the wireless access point on the user equipment. The fifth means 26 comprises: a first unit for detecting whether a trigger condition for presenting the advertisement information is satisfied; and a second unit for presenting, when the trigger condition is satisfied, the advertisement information corresponding to the wireless access point on the user equipment, and the trigger condition comprises: acquiring a wireless access point that the user equipment selects to connect to; and acquiring, based on SSID information of the wireless access point, advertisement information corresponding to the wireless access point.

In one embodiment, a trigger signal corresponding to a trigger condition is a request for accessing the wireless access point from the user equipment, and the network device receives the condition of a request for accessing the wireless access point from the user equipment. Here, the request for accessing the wireless access point sent by the user equipment is a trigger signal satisfying the trigger condition, and the network device receives the trigger signal, indicating that the trigger condition is satisfied, and performs an action of determining the advertisement information corresponding to the wireless access point. When the user equipment needs to access the wireless access point, the network equipment needs to determine the advertisement information corresponding to the wireless access point by means of searching, matching, etc., and when the trigger condition comprises acquiring the wireless access point to be provided to a user, the advertisement information corresponding to the wireless access point is searched for and matched at the network device end, provided to the user equipment and presented to the user at the user equipment, and when the user accesses the wireless access point and then views the user equipment, the advertisement information near the wireless access point can be viewed.

In one embodiment, the trigger condition comprises acquiring advertisement information corresponding to the wireless access point, and when the trigger condition for acquiring the wireless access point that the user equipment selects to connect to is satisfied, the network device needs to determine the corresponding advertisement information near the position of the wireless access point according to the SSID information of the wireless access point accessed by the user, in particular, position information, namely latitude and longitude information; further, one or more pieces of advertisement information included in a certain range of the wireless access point may be determined by means of position matching, so that the advertisement information corresponding to the wireless access point may be determined and pushed to the user equipment, and the user equipment may receive the advertisement information and then present the advertisement information to the user.

The seventh means 27 is used for reselecting, based on network connection failure information, the wireless access point with the accessible prompt information for connection, and the seventh means 27 comprises: an eleventh unit for detecting a network connection state of the connected wireless access point; a twelfth unit for acquiring, if a wireless connection between the user equipment and the wireless access point fails, network connection failure information; and a thirteenth unit for reselecting, based on the network connection failure information, the wireless access point with the accessible prompt information for connection.

Here, the user equipment is currently connected to the wireless network of the corresponding wireless access point, but the current network condition may be poor; at this time, the user equipment determines the network condition by means of a network condition detection function, for example, by means of sending a PING (Packet Internet Groper) data packet to a target domain name or a target IP, determines the current network condition based on corresponding data packet information fed back, and then feeds the detected current network condition back to a corresponding user, so as to remind the user based on the current network condition, or autonomously determine to make a corresponding processing, for example, when it is determined that the current network condition is poor, the user is reminded to enable the wireless connection described in the present application to reselect a target wireless access point. Furthermore, the network condition detection function can be opened at any time during the entire process of the network connection of the user equipment, so that the current network condition of the user equipment can be positively fed back in real time, and thus an actual condition of unsmooth user network connection can be found as early as possible and solved, thereby optimizing the user experience.

In one embodiment, in practical applications, although sometimes the access information of the target wireless access point is known, the wireless connection may not be successfully realized, for example, a connection is established with the wireless access point based on the access information of the wireless access point returned by the network device, however, when the access information corresponding to an actual wireless access point changes and a corresponding update is not performed in time in the corresponding network device, a network disconnection occurs after a certain period of connection; and for another example, if a wireless access point signal is unstable, the network disconnection may also occur. At this time, the user can repeat a selection operation of the wireless access point and select another wireless access point; and at this time, the user equipment may also actively provide an appropriate candidate wireless access point for a corresponding user. Firstly, if a wireless connection between the user equipment and the wireless access point fails to be established, the user equipment acquires WiFi network disconnection information, and the user equipment maintains a network connection state, for example, automatically opening or maintaining an original mobile communication network, such as a GSM network, a CDMA network, a 3G network, a 4G network, etc., or automatically opening or maintaining an original wireless local area network, such as a WiFi network, etc.; furthermore, in a network environment, when the wireless connection of the wireless access point is disconnected, the user equipment acquires corresponding network disconnection information; further, the user equipment may directly determine, based on the network disconnection information, the candidate wireless access point with the accessible prompt information in a WiFi system list of the user equipment; and at this time, the existence of the candidate wireless access point with the accessible prompt information indicates that the access information of the access point has been stored locally at the user equipment, and the user equipment establishes, based on the access information of the candidate wireless access point, a wireless connection between the user equipment and the candidate wireless access point. Here, the establishment of a connection with the candidate wireless access point may comprise prompting a user to select the candidate wireless access point, and then performing a corresponding wireless connection based on a user selection operation; and the establishment of a connection with the candidate wireless access point may further comprise automatically connecting the candidate wireless access point after the user equipment acquires the access information of the candidate wireless access point.

Here, in the present application, where a wireless connection between the user equipment and the wireless access point fails, a candidate wireless access point with accessible prompt information is automatically selected for the user equipment for connection, thereby efficiently providing the user with an available wireless access point so as to satisfy the user's need for accessing the network, simplifying the user operation and improving the user experience.

Figure 8:
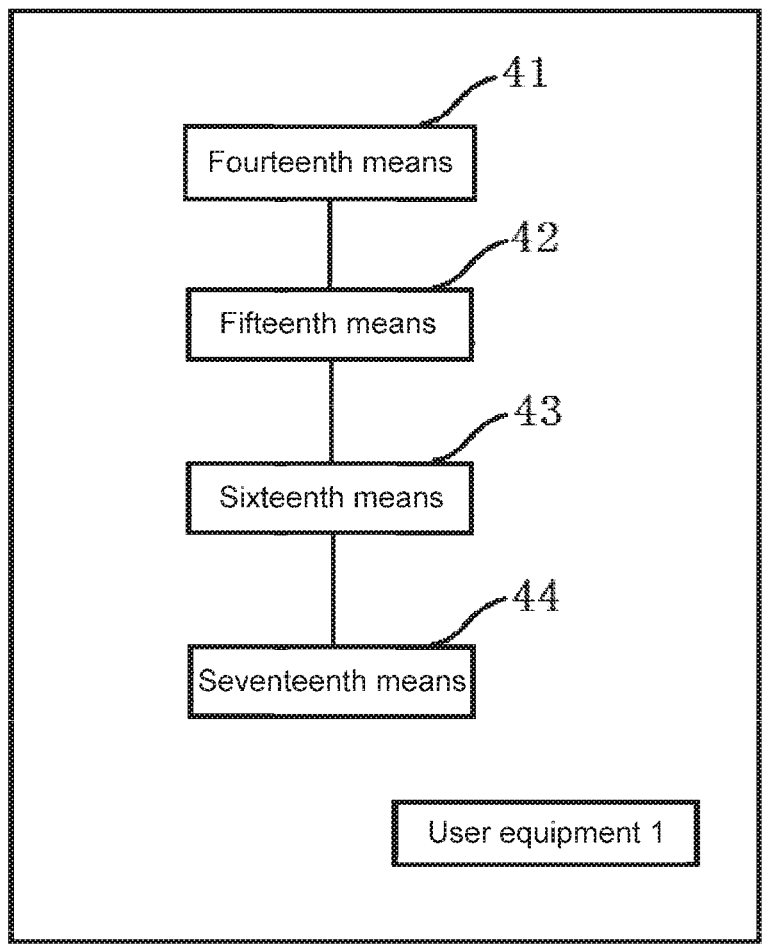
FIG. 8 shows a device schematic diagram of user equipment for establishing a wireless connection according to one embodiment of the present application.

FIG. 8 shows a device schematic diagram of user equipment for establishing a wireless connection.

In one embodiment, fourteenth means is used for acquiring, by user equipment, a wireless access point near the user equipment; fifteenth means is used for sending, to a network device, an access request for the wireless access point, and the access request comprises SSID information of the wireless access point; sixteenth means is used for acquiring access information and POI information, which correspond to the wireless access point and are returned by the network device based on the access request, and displaying accessible prompt information and POI information on a native system wireless access point list of the user equipment; and seventeenth means is used for establishing, based on the access information and the POI information of the wireless access point, a wireless connection between the user equipment and the wireless access point.

In one embodiment, the fourteenth means is used for acquiring, by user equipment, a wireless access point near the user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

The fifteenth means is used for sending, to a network device, an access request for the wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

The sixteenth means is used for acquiring access information and POI information, which correspond to the wireless access point and are returned by the network device based on the access request, and displaying accessible prompt information and the POI information on a native system wireless access point list of the user equipment. Here, the access information of one or more wireless access points displayed in a native system WiFi list of the user equipment is acquired by the user equipment from the network device based on its own scanning function and cooperation with the corresponding network device. Further, accessible prompt information is displayed on the native system WiFi list of the user equipment. In the native system WiFi list, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the user equipment, in combination with the accessible prompt information corresponding to various wireless access points, a user selects a wireless access point which is needed by himself/herself to access the wireless network. In one embodiment, a system WiFi device of the user equipment scans out one or more wireless access points, acquires SSID information of one or more wireless access points, and acquires access information of the wireless access point by means of a third-party application end on the user equipment and sends the SSID information of one or more wireless access points to the third-party application end of the user equipment, and the third-party application end on the user equipment queries corresponding access information from the network device based on the SSID information of one or more wireless access points; and the network device sends the stored access information to a third-party application end of the user equipment, and the third-party application end of the user equipment interacts with the system WiFi device of the user equipment, and displays an accessible prompt information of the wireless access point on the native system WiFi list of the user equipment. Here, the POI is an abbreviation for "Point of Interest", and it can be translated as "兴趣点", or "信息点" in Chinese. A POI may be a house, a shop, a postbox, a bus station, etc., and one POI information point may have the contents of four embodiments: name, category, longitude and latitude (specific address). In one embodiment, when a third-party application end on the user equipment queries the network device for corresponding access information based on SSID information of one or more wireless access points and also queries whether the one or more wireless access points store corresponding POI information, and if the network device stores the POI information corresponding to the one or more wireless access points, the POI information is sent together with the access information of the wireless access point to the third-party application end of the user equipment, and the third-party application end of the user equipment interacts with the system WiFi device of the user equipment and displays the accessible prompt information and the POI information of the wireless access point at the same time on the native system WiFi list of the user equipment. Further, in several wireless access points presented by the user equipment, in combination with accessible prompt information and POI information corresponding to various wireless access points, a user selects a wireless access point which is needed by himself/herself to access the wireless network. Here, the POI information displayed in a system WiFi list of the user equipment can provide richer reference data for a user to select the wireless access point. For example: the SSID information of the wireless access point is displayed in a native system WiFi list of the user equipment, and a user may not accurately select, based on the SSID information, the wireless access point which is needed to connect by himself/herself, however, by displaying POI information in the native system WiFi list of the user equipment, the user can intuitively and conveniently connect, based on the POI information, the wireless access point to be connected, and the presentation of the POI information includes, but is not limited to, a network bandwidth, the number of connecting people, a merchant name, merchant discount information, address information, etc.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free.

Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

Seventeenth means for establishing, based on the access information and the POI information of the wireless access point, a wireless connection between the user equipment and the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, and requests for access information and POI information corresponding to the corresponding wireless access points from a corresponding network device. The user equipment acquires the access information and the POI information and displays accessible prompt information and the POI information on a system wireless access point list of the user equipment. The user equipment establishes a wireless connection with a corresponding wireless access point by means of the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. Further, the POI information displayed on the native system wireless list of the user equipment can efficiently provide the user with an available wireless access point so as to satisfy the user's need for accessing the network, while simplifying the user operation and improving the user experience.

Figure 9:
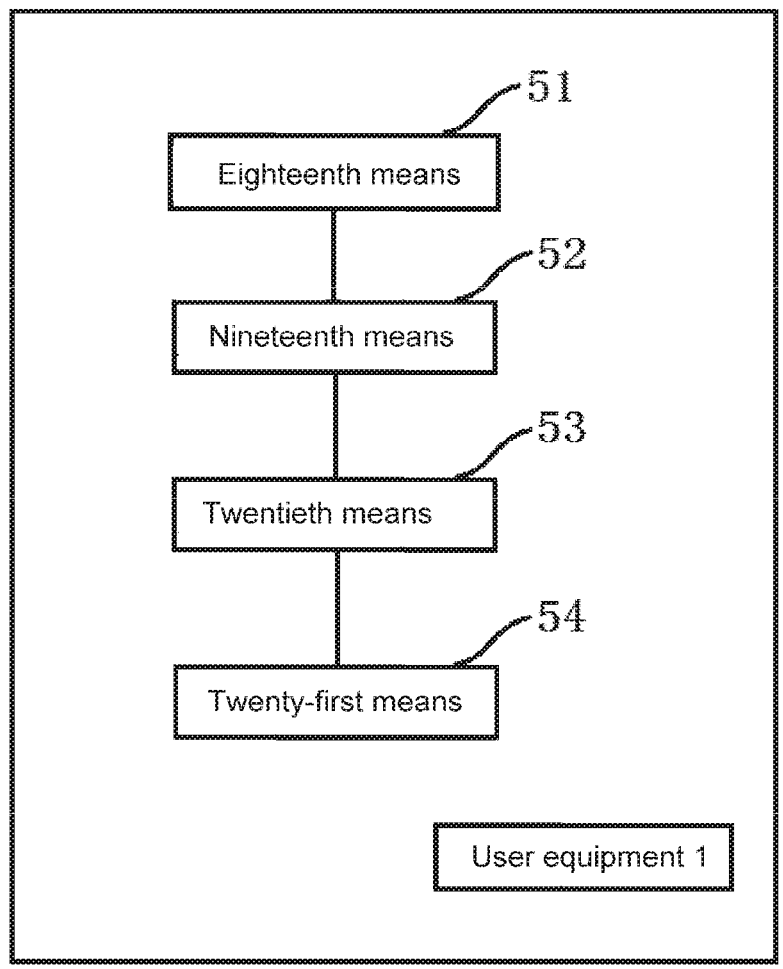
FIG. 9 shows a device schematic diagram of user equipment for establishing a wireless connection according to one embodiment of the present application.

FIG. 9 shows a device schematic diagram of user equipment for establishing a wireless connection.

In one embodiment, eighteenth means is used for acquiring a wireless access point near user equipment; nineteenth means is used for sending, to a network device, an access request for the wireless access point, and the access request comprises SSID information of the wireless access point; twentieth means is used for acquiring access information and POI information, which correspond to the wireless access point and are returned by the network device based on the access request, and displaying accessible prompt information and the POI information on a wireless access point list of the third-party application end of the user equipment; and twenty-first means is used for establishing, based on the access information and the POI information of the wireless access point, a wireless connection between the user equipment and the wireless access point.

In one embodiment, the eighteenth means is used for acquiring a wireless access point near user equipment. Here, the user equipment comprises various smart terminal devices capable of realizing wireless communication functions, such as a smart phone, a tablet, etc. A wireless access point is an access point corresponding to a wireless network, and the wireless network includes, but is not limited to, a wireless local area network based on IEEE 802.11 series standard protocol, for example, a wireless local area network based on IEEE 802.11b protocol, namely, a so-called WiFi network, and the user equipment can access the corresponding wireless network via the wireless access point.

The nineteenth means is used for sending, to a network device, an access request for the wireless access point, and the access request comprises SSID information of the wireless access point. The SSID (Service Set Identifier) information is used to identify a wireless network corresponding to the wireless access point. Further, the SSID may also be sub-divided into a BSSID (Basic Service Set Identifier) and an ESSID (Extended Service Set Identifier), and the BSSID is used to identify a smaller BSS (Basic Service Set) area, with each host performing communication in the smaller area, while the ESSID is applied in a larger and more complex wireless network. Here, different BSSes can be extended to corresponding ESSes (Extended Service Set). In one embodiment, after user equipment scans out one or more wireless access points near the user equipment, the user equipment sends an access request for the one or more wireless access points to the network device. At this time, in one embodiment the user equipment completes the sending of the access request based on a currently existing data communication method, for example, completing the sending of the access request based on an opened mobile communication network, such as a GSM network, a CDMA network, a 3G network, a 4G network, etc.; and for another example, the user equipment completes the sending of the access request based on an opened wireless local area network, such as a WiFi network, etc. Here, the access request comprises: requesting the network device to return access information that is stored in the network device and matches the wireless access point, such as a connection password corresponding to the wireless access point, etc. Further, by the user equipment sending an access request comprising the SSID information of the wireless access point and the BSSID information (an MAC address of the wireless access point), the network device searches for and determines the access information of the corresponding wireless access point based on the SSID information of the wireless access point and the BSSID information.

The twentieth means is used for acquiring access information and POI information, which correspond to the wireless access point and are returned by the network device based on the access request, and displaying accessible prompt information and the POI information on a wireless access point list of a third-party application end of the user equipment. Here, the access information of one or more wireless access points displayed in a WiFi list of the third-party application end of the user equipment is acquired by the user equipment from the network device based on its own scanning function and cooperation with the corresponding network device. Further, accessible prompt information is displayed on the WiFi list of the third-party application end of the user equipment. In the WiFi list of the third-party application end of the user equipment, the accessible prompt information is represented by a certain graphic identifier, so as to clearly prompt the user of which wireless access points have an available free connection password, thereby facilitating the user in selecting a target wireless access point. The access information of the wireless access point, such as a connection password corresponding to the wireless access point, etc., has been sent from the network device to the user equipment and stored on the user equipment. Further, in several wireless access points presented by the third-party application end of the user equipment, in combination with the accessible prompt information corresponding to various wireless access points, a user selects a wireless access point which is needed by himself/herself to access the wireless network. In one embodiment, a WiFi device of the third-party application end of the user equipment scans out one or more wireless access points, acquires SSID information of the one or more wireless access points, and acquires access information of the wireless access point by means of the third-party application end on the user equipment, and the third-party application end on the user equipment queries the network device for corresponding access information based on the SSID information of the one or more wireless access points; and the network device sends the stored access information to the third-party application end of the user equipment, and accessible prompt information of the wireless access point is displayed on a WiFi list of the third-party application end of the user equipment. Here, the POI is an abbreviation for "Point of Interest", and it can be translated as "兴趣点", or "信息点" in Chinese. A POI may be a house, a shop, a postbox, a bus station, etc., and one POI information point at least has the contents of four embodiments: name, category, longitude and latitude (specific address), In one embodiment, when a third-party application end on the user equipment queries the network device for corresponding access information based on the SSID information of one or more wireless access points and also queries whether the one or more wireless access points store corresponding POI information, and if the network device stores the POI information corresponding to the one or more wireless access points, the POI information is sent together with the access information of the wireless access point to the third-party application end of the user equipment, and the accessible prompt information and the POI information of the wireless access point are displayed at the same time on the WiFi list of the third-party application end of the user equipment. Further, in several wireless access points presented by the third-party application end of the user equipment, in combination with the accessible prompt information and the POI information corresponding to various wireless access points, a user selects a wireless access point which is needed by himself/herself to access the wireless network. Here, the POI information displayed in the WiFi list of the third-party application end of the user equipment can provide richer reference data for a user to select the wireless access point. For example: the SSID information of the wireless access point is displayed in a native system WiFi list of the user equipment, and a user may not accurately select, based on the SSID information, the wireless access point which is needed to connect by himself/herself, however, by displaying POI information in the WiFi list of the third-party application end of the user equipment, the user can intuitively and conveniently connect, based on the POI information, the wireless access point to be connected, and the presentation of the POI information includes, but is not limited to, a network bandwidth, the number of connecting people, a merchant name, merchant discount information, address information, etc. In addition, an owner of a wireless access point can manage his/her own wireless access point by means of a third-party application end and modify POI information of his/her own wireless access point according to his/her own requirement, such that a user can more intuitively and rapidly find the wireless access point.

In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and BSSID Information (the MAC address of the wireless access point) of the wireless access point. Further, if the access information corresponding to the target wireless access point exists in the network device, the access information matching the wireless access point can be found in the network device based on the SSID information.

Twenty-first means for establishing, based on the access information and the POI information of the wireless access point, a wireless connection between the user equipment and the wireless access point. Here, based on the access information, which corresponds to the wireless access point and is returned from the network device, the wireless connection can be realized. Here, the establishment of a wireless connection can be user equipment automatically initiating, based on the acquired access information, a connection request to a wireless access point, with the whole connection process automatically running in the background; and the establishment of a wireless connection can also be presenting access information of an access point to a user corresponding to the user equipment, for example, sending the access information to the user equipment in a manner of prompt information within a device application program, so that the user then performs wireless connection based on the acquired access information, for example, the user selects to send a connection request to the wireless access point by manually inputting connection password information, so as to establish a connection between the user equipment and the target wireless access point, without reinstalling an access information device while connecting a wireless access point in the above-mentioned two connection methods.

In this instance, user equipment acquires, based on one or more scanned wireless access points, SSID information of corresponding wireless access points, requests for access information and POI information corresponding to the corresponding wireless access points from a corresponding network device, acquires the access information and the POI information corresponding to the wireless access points and returned by the network device based on the access request and displays accessible prompt information and the POI information on a wireless access point list of a third-party application end of the user equipment. The user equipment establishes a wireless connection with a corresponding wireless access point by means of the access information. Here, in the present application, the access information of the wireless access point, such as a connection password for connection and verification, can be sent and stored on the user equipment so as to help the user equipment to directly establish a wireless connection with the wireless access point, without reinstalling an access information device while connecting a wireless access point. Further, by displaying connectability prompt information on a system wireless list of the user equipment, the user can know, based on the connectability prompt information, which wireless access points have access passwords, and preferentially select a wireless access point which is needed by himself/herself, such that the user can conveniently and rapidly use a corresponding wireless network, and the probability of no available network for a user is reduced. Further, the POI information displayed on the wireless list of the third-party application end of the user equipment can efficiently provide the user with an available wireless access point so as to satisfy the user's need for accessing the network, while simplifying the user operation and improving the user experience. In addition, an owner of a wireless access point can manage his/her own wireless access point by means of a third-party application end and modify POI information of his/her own wireless access point according to his/her own requirement, such that a user can more intuitively and rapidly find the wireless access point.

In the network device, twenty-second means is used for receiving an access request for a wireless access point sent by user equipment; twenty third means is used for determining, based on the access request from the user equipment, access information and POI information corresponding to the wireless access point; and twenty fourth means is used for sending the access information and the POI information of the wireless access point to the user equipment. In one embodiment, the network device stores massive wireless access points in various areas and their respective corresponding access information, or further comprises the wireless access point information corresponding to the wireless access point. The access information includes, but is not limited to, a connection password of the wireless access point. The access information of the wireless access point stored in the network device comprises access information provided by a public wireless network operator, or access information of wireless access points shared and provided by individuals, or access information of a mobile wireless access point provided by a personal mobile device. For the access request from the user equipment and access information of the wireless access point that is indeed also stored in the corresponding network device at the same time, the user equipment can acquire the access information for free. Here, each wireless access point stored in the network device is uniquely identified by its corresponding network SSID (Service Set Identifier) and an MAC (Media Access Control) address of the wireless access point. The user equipment sends, to the network device, an access request for the wireless access point, and the access request comprises SSID information corresponding to the wireless access point, and the SSID information comprises name information (SSID) and B SSID Information (the MAC address of the wireless access point) of the wireless access point. Further, if the access information corresponding to the target wireless access point exists in the network device, the access information matching the wireless access point can be found in the network device based on the SSID information.

What is claimed is:

1. A method for establishing a wireless connection at a user equipment end, comprising:
    acquiring a wireless access point near the user equipment;
    sending, to a network device, an access request for the wireless access point, wherein the access request comprises service set identification SSID information of the wireless access point;
    acquiring access information corresponding to the wireless access point returned by the network device based on the access request, and displaying accessible prompt information on a wireless access point list of native system of the user equipment;
    establishing, based on the access information of the wireless access point, a wireless connection between the user equipment and the wireless access point;
    detecting a network connection state of the connected wireless access point;
    if a wireless connection between the user equipment and the wireless access point fails, acquiring the network connection failure information; and
    reselecting, based on the network connection failure information, a wireless access point with the accessible prompt information for connection.

2. The method for establishing a wireless connection according to claim 1, further comprising:
    presenting advertisement information corresponding to the wireless access point on the user equipment.

3. The method for establishing a wireless connection according to claim 2, wherein the step of presenting advertisement information corresponding to the wireless access point on the user equipment specifically comprises:
    detecting whether a trigger condition for presenting the advertisement information is satisfied; and
    when the trigger condition is satisfied, presenting the advertisement information corresponding to the wireless access point on the user equipment,
    wherein the trigger condition comprises:
    acquiring a wireless access point that the user equipment selects to connect to; and
    acquiring, based on SSID information of the wireless access point, advertisement information corresponding to the wireless access point.

4. The method for establishing a wireless connection according to claim 1, further comprising:
  detecting a security state of the acquired wireless access point.

5. The method for establishing a wireless connection according to claim 4, wherein the step of detecting a security state of the acquired wireless access point comprises:
  receiving a wireless signal from the wireless access point near the user equipment;
  acquiring the SSID information of the wireless access point;
  sending, to the network device, a security state detection request for the wireless access point, wherein the detection request comprises the SSID information; and
  acquiring security state detection information of the wireless access point.

6. The method for establishing a wireless connection according to claim 1, further comprising:
  detecting a connection state of the selected wireless access point with the accessible prompt information at the user equipment;
  if the wireless access point with the accessible prompt information is in a first-time-connection state at the user equipment, authenticating the access information of the wireless access point; and
  allowing the user equipment to establish a connection with the wireless access point, after the authentication is passed.

7. The method for establishing a wireless connection according to claim 6, further comprising:
  if a connection record of the wireless access point with the accessible prompt information has been stored at the user equipment, the user equipment directly establishing a wireless connection with the wireless access point.

8. A method for establishing a wireless connection at a network device end, comprising:
  receiving an access request for a wireless access point sent by a user equipment;
  determining, based on the access request from the user equipment, access information corresponding to the wireless access point;
  sending the access information of the wireless access point to the user equipment;
  receiving a detection request for a security state of the wireless access point sent by the user equipment;
  determining, based on the detection request from the user equipment, one or more security states of wireless access points; and
  sending security state detection information of the wireless access points to the user equipment.

9. The method for establishing a wireless connection to claim 8, wherein the step of determining the access information comprises:
  determining, based on the access request from the user equipment, access information and point of interest POI information corresponding to the wireless access point; and
  wherein the step of sending the access information comprises:
  sending the access information and the POI information of the wireless access point to the user equipment.

10. A method for establishing a wireless connection at a user equipment end, comprising:
  acquiring a wireless access point near the user equipment;
  sending, to a network device, an access request for the wireless access point, wherein the access request comprises SSID information of the wireless access point;
  acquiring access information and POI information corresponding to the wireless access point returned by the network device based on the access request, and displaying accessible prompt information and the POI information on a wireless access point list of the user equipment, wherein the wireless access point list comprises the wireless access point list of a native system of the user equipment or the wireless access point list of a third-party application of the user equipment;
  establishing, based on the access information and the POI information of the wireless access point, a wireless connection between the user equipment and the wireless access point;
  detecting a network connection state of the connected wireless access point;
  if a wireless connection between the user equipment and the wireless access point fails, acquiring network connection failure information; and
  reselecting, based on the network connection failure information, a wireless access point with the accessible prompt information for connection.

* * * * *